(12) United States Patent
Toyama et al.

(10) Patent No.: US 10,967,899 B2
(45) Date of Patent: Apr. 6, 2021

(54) VEHICLE

(71) Applicant: Toyota Jidosha Kabushiki Kaisha, Toyota (JP)

(72) Inventors: Noritaka Toyama, Anjo (JP); Atsuko Kobayashi, Nagoya (JP); Keiko Nagatomi, Toyota (JP); Keisuke Ito, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 51 days.

(21) Appl. No.: 16/267,585

(22) Filed: Feb. 5, 2019

(65) Prior Publication Data

US 2019/0241205 A1 Aug. 8, 2019

(30) Foreign Application Priority Data

Feb. 8, 2018 (JP) .............................. JP2018-021414

(51) Int. Cl.
*B62D 1/183* (2006.01)
*B60N 3/00* (2006.01)

(52) U.S. Cl.
CPC ............. *B62D 1/183* (2013.01); *B60N 3/005* (2013.01)

(58) Field of Classification Search
CPC .......... B62D 1/183; B62D 1/10; B60N 3/005; B60N 2/0244; B60N 2/06; B60N 3/001; B60N 3/002
See application file for complete search history.

(56) References Cited

U.S. PATENT DOCUMENTS

| | | | |
|---|---|---|---|
| 2004/0144196 A1* | 7/2004 | Thomas | B60N 3/005 74/558 |
| 2016/0362126 A1 | 12/2016 | Lubischer et al. | |
| 2016/0375811 A1* | 12/2016 | Bendewald | B60N 3/002 701/49 |
| 2016/0375927 A1* | 12/2016 | Schulz | B62D 1/192 280/775 |
| 2017/0259772 A1* | 9/2017 | Farooq | B60R 21/0136 |
| 2018/0037248 A1* | 2/2018 | Schwarz | B60W 60/0051 |
| 2018/0244174 A1* | 8/2018 | Tan | B60N 2/0244 |
| 2018/0273081 A1* | 9/2018 | Lubischer | B62D 1/28 |
| 2019/0061491 A1* | 2/2019 | Hoggarth | B60J 5/0493 |
| 2019/0084609 A1* | 3/2019 | Rogers | B62D 1/187 |
| 2019/0118852 A1* | 4/2019 | Suzuki | B60T 7/042 |
| 2019/0248263 A1* | 8/2019 | Nagatomi | A47B 5/006 |
| 2020/0055481 A1* | 2/2020 | Mimura | B62D 1/183 |

FOREIGN PATENT DOCUMENTS

| | | |
|---|---|---|
| CN | 106314524 A | 1/2017 |
| CN | 106458073 A | 2/2017 |
| CN | 109533003 A | 3/2019 |
| JP | H09175245 A | 7/1997 |

* cited by examiner

*Primary Examiner* — James A English
*Assistant Examiner* — Kurtis Nielson
(74) *Attorney, Agent, or Firm* — Dinsmore & Shohl LLP

(57) ABSTRACT

A vehicle includes a steering wheel that can move between a driving position in which an occupant operates the steering wheel and a table position in which a wheel axis is oriented in a vehicle vertical direction. The steering wheel in the table position functions as a table or a part of a table for use by the occupant, who is sitting in a driver's seat.

14 Claims, 12 Drawing Sheets

FIG.10
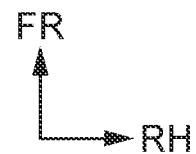
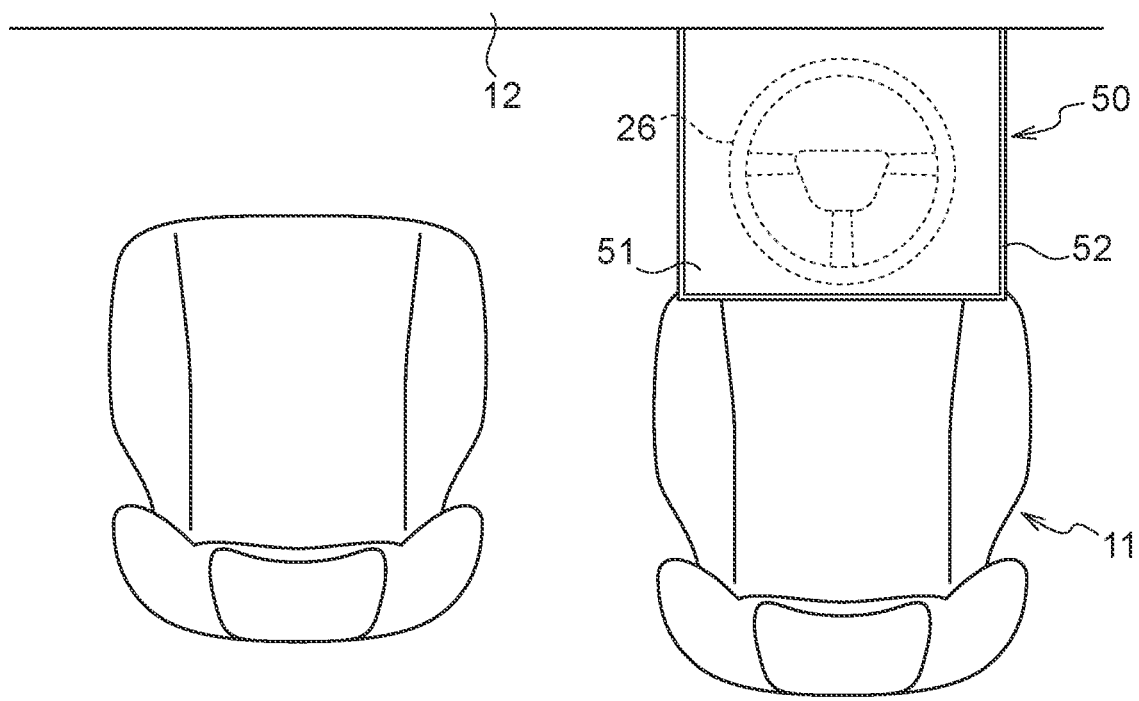

VEHICLE

CROSS-REFERENCE TO RELATED APPLICATION

This application claims priority under 35 USC 119 from Japanese Patent application No. 2018-21414 filed on Feb. 8, 2018, the disclosure of which is incorporated by reference herein in its entirety.

BACKGROUND

Technical Field

The present disclosure relates to a vehicle.

Related Art

Japanese Patent Application Laid-Open No. 09-175245 discloses a vehicle interior-and-exterior table having a table plate that can be supported by any of a vehicle interior stand or a vehicle exterior stand.

SUMMARY

In the technology of Japanese Patent Application Laid-Open No. 09-175245, the use of the table inside a vehicle puts a heavy workload on a user, to attach the vehicle interior stand, to secure space inside the vehicle, and the like. There is also a difficulty in providing a table for an occupant who is sitting in a driver's seat, owing to interference with a steering wheel.

The present disclosure is implemented considering the circumstances described above. The present disclosure aims at providing a vehicle that can prepare a driver's table with an easy operation.

A vehicle according to a first aspect includes a steering wheel that can move between a driving position in which an occupant operates the steering wheel and a table position in which a wheel axis is oriented in a vehicle vertical direction. The steering wheel in the table position functions as a table or a part of a table for use by the occupant, who is sitting in a driver's seat.

According to the vehicle of the first aspect, the steering wheel can move between the driving position and the table position. In the steering wheel in the table position, the wheel axis is oriented in the vehicle vertical direction. The steering wheel in the table position functions as a table or part of a table for use by an occupant sitting in the driver's seat.

Therefore, since the steering wheel itself configures the table or part of the table, a table for the driver can be prepared without any concerns regarding the potential issue of interference with the steering wheel.

The steering device may be moved by the occupant grasping the steering wheel and applying manual force to the steering wheel, or may be electrically moved in response to an operation using a button or the like.

According to a vehicle of a second aspect, in the first aspect, the steering wheel has a flat top plate surface having a normal direction that is oriented in a vehicle upward direction in the table position.

According to the vehicle of the second aspect, the steering wheel has a top plate surface. In a case in which the steering wheel is in the table position, the top plate surface becomes a flat surface having a normal direction that is oriented in the vehicle upward direction. In other words, the steering wheel itself functions as a top plate having a top plate surface on which an object or the like can be placed. This avoids the time and effort required to provide a separate top plate member or the like on the steering wheel, thus allowing a table to be prepared with a simpler operation.

A vehicle according to a third aspect, in the first aspect, further includes a top plate member that is configured to fit onto the steering wheel in the table position. The top plate member in a fitted state configures a top plate of the table for use by the occupant sitting in the driver's seat.

In the vehicle according to the third aspect, the top plate member that is configured to fit onto the steering wheel in the table position is provided. The top plate member in a fitted state configures the top plate of the table for use by the occupant sitting in the driver's seat. Therefore, the steering wheel in the table position functions as a part (support portion) of the table for use by the occupant sitting in the driver's seat.

This eliminates the need for forming a top plate surface on which an object can be put in the steering wheel itself, thus allowing securing freedom in the design of the steering wheel.

A vehicle according to a fourth aspect, in any one of the first to third aspects, further includes an object detection unit that determines whether or not an object has been placed on the table. In a case in which an object is present on the table, the steering wheel is prohibited from moving from the table position.

In the vehicle according to the fourth aspect, the object detection unit that determines whether or not the object has been placed on the table is provided. In a case in which an object is present on the table, the steering wheel is prohibited from moving from the table position.

Since the steering wheel does not move to the driving position or the like, while the object is put thereon, it is possible to prevent a drop of the object.

A vehicle according to a fifth aspect, in the first aspect, further includes a top plate member that can move between a containment position in which the top plate member is contained in an instrument panel and a table position in which the top plate member protrudes from the instrument panel in a vehicle rearward direction. The steering wheel in the table position functions as a support portion of the table for use by the occupant sitting in the driver's seat, by supporting the top plate member in the table position from beneath.

In the vehicle according to the fifth aspect, a top plate member that can move between a containment position in which it is contained in the instrument panel and a table position in which it protrudes from the instrument panel in the vehicle rearward direction, is further provided. The top plate member in the table position is supported from beneath by the steering wheel in the table position.

Therefore, it is possible to ensure the strength of the table in a configuration in which the top plate member protrudes from the instrument panel in the vehicle rearward direction. Furthermore, since the steering wheel itself does not configure the top plate, it is possible to ensure freedom in the design of the steering wheel. Furthermore, since the table is prepared by moving the top plate member from the containment position to the table position, it is possible to avoid the time and effort required to fit a separate top plate member or the like on the steering wheel.

According to a vehicle of a sixth aspect, in the fifth aspect, the top plate member can slide from the table position to an evacuation position in which the top plate member allows the steering wheel to return to the driving position while an object remains placed on the top plate member.

If the top plate member is maintained in the table position, the steering wheel cannot return to the driving position. However, in a case where an object is present on the top plate member, moving the top plate member to the containment position may cause a drop of the object.

Thus, in the vehicle according to the sixth aspect, the top plate member can slide from the table position to the evacuation position, while the object remains placed thereon. The evacuation position is a position that allows the steering wheel to return to the driving position.

Therefore, the steering wheel can return to the driving position, while the object remains placed on the top plate member.

According to a vehicle of a seventh aspect, in the sixth aspect, the evacuation position of the top plate member is situated at the side of a front passenger seat in a vehicle width direction, relative to the table position of the top plate member.

In the vehicle according to the seventh aspect, the evacuation position of the top plate member is situated at the side of the front passenger seat in the vehicle width direction, relative to the table use position. Therefore, in a state that the top plate member is in the evacuation position, the occupant sitting in the driver's seat can laterally reach out his or her hand to the object that is put on the top plate member, and take the object in his or her hand.

A vehicle according to an eighth aspect, in any one of the first to seventh aspects, further includes a control unit that controls the driver's seat. While the steering wheel moves from the driving position to the table position, the control unit slides the driver's seat to a table use position that is in a vehicle rearward position, relative to a normal driving position.

In the vehicle according to the eighth aspect, the control unit that controls the driver's seat is provided. While the steering wheel moves from the driving position to the table position, the control unit slides the driver's seat to the table use position that is in the vehicle rearward position, relative to the normal driving position. Therefore, large space is automatically secured around feet of the driver who is using the table, thus resulting in an improvement in comfortableness According to a vehicle of a ninth aspect, in the eighth aspect, while the steering wheel moves from the table position to the driving position, the control unit slides the driver's seat to the normal driving position.

In the vehicle according to the ninth aspect, while the steering wheel moves from the table position to the driving position, the control unit slides the driver's seat to the normal driving position. Therefore, since the driver's seat automatically returns to the normal driving position, it is possible to save time and effort to readjust the position of the driver's seat, at the time of starting driving.

As described above, according to the present disclosure, the table for the driver can be prepared with the simple operation.

BRIEF DESCRIPTION OF THE DRAWINGS

FIG. 10 is a top plan view in the table state according to the third embodiment;

DETAILED DESCRIPTION

First Embodiment: Steering Wheel Itself Becomes Table

A first embodiment will be described below with reference to FIGS. 1 to 3.

Note that, in each of the drawings, an arrow FR represents a vehicle frontward direction, an arrow UP represents a vehicle upward direction, and an arrow RH represents a left side in a vehicle width direction. In the following description, in a case where a longitudinal direction, a vertical direction, or a lateral direction is used without being specified, the longitudinal direction represents a vehicle longitudinal direction, the vertical direction represents a vehicle vertical direction, and the lateral direction represents a vehicle lateral direction.

Figure 1:
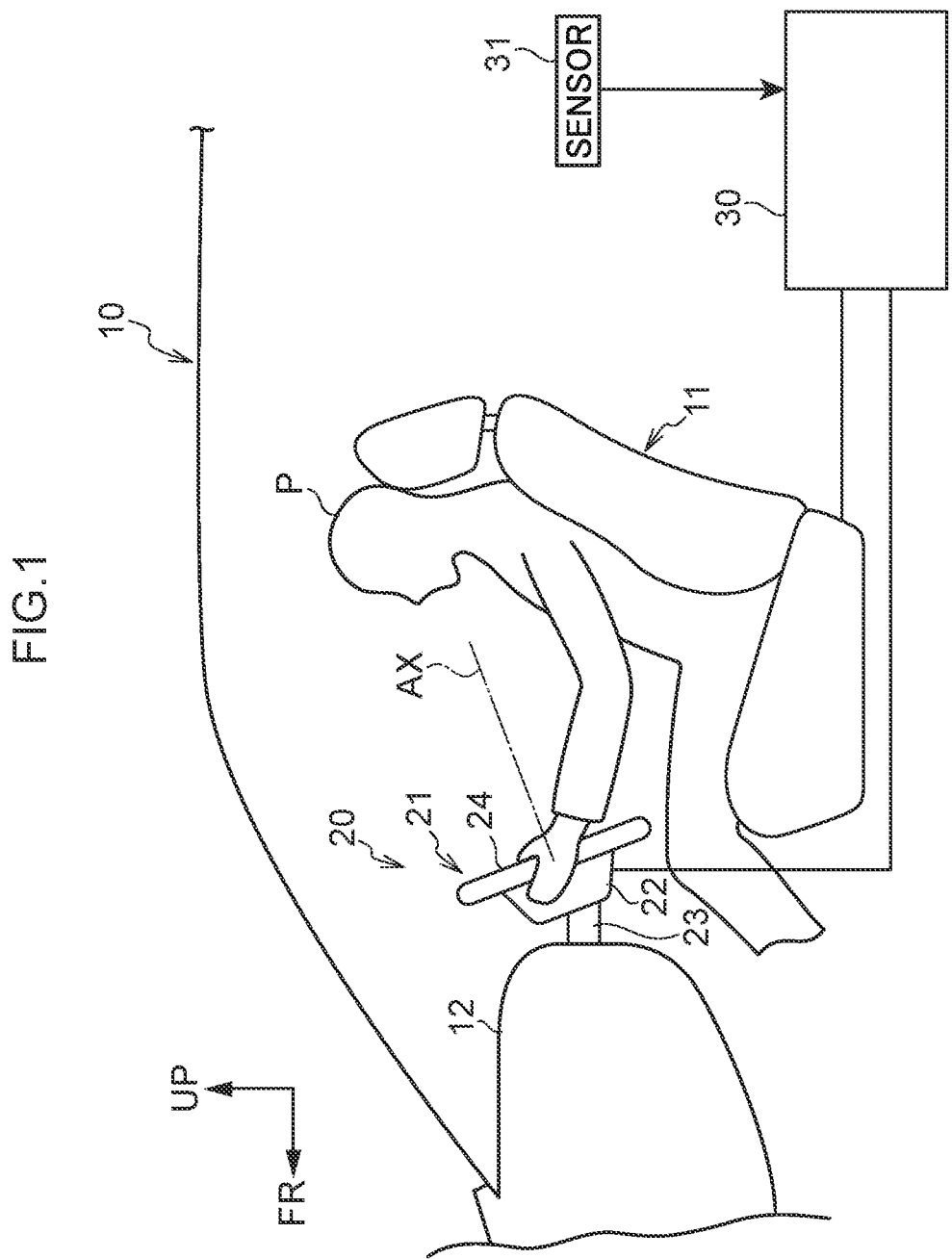
FIG. 1 is a side view of a vehicle according to a first embodiment, showing the vicinity of a driver's seat in a driving state.

FIG. 1 is a side view of a vehicle 10 according to the first embodiment, schematically showing the vicinity of a driver's seat 11. As shown in FIG. 1, an instrument panel 12 is disposed in front of the driver's seat 11. The instrument panel 12 is provided with a steering device 20. The steering device 20 includes a steering wheel 21 that can be rotated about a wheel axis AX, a rotation base 22 that is a base of the rotation of the steering wheel 21, and an extendable portion 23 that connects between the rotation base 22 and the instrument panel 12. The steering device 20 adopts a so-called steer-by-wire method.

The rotation base 22 is coupled to a rear portion of the extendable portion 23 in such a manner as to be rotatable about an axis in the vehicle width direction (a direction orthogonal to the planes of FIGS. 1 and 2), relative to the extendable portion 23. The extendable portion 23 is coupled to the instrument panel 12 at its front portion, and is coupled to the rotation base 22 at its rear portion. The extendable portion 23 is extendable in the vehicle longitudinal direction, with respect to the instrument panel 12. Concrete mechanisms of the rotation base 22 and the extendable portion 23 are not specifically limited. The steering device 20 is thereby configured to be changeable between a plurality of states, i.e. a driving state shown in FIG. 1 and a table state shown in FIG. 2. The position of the steering wheel 21 in the driving state is referred to as a driving position. The position of the steering wheel 21 in the table state is referred to as a table position.

In the driving state shown in FIG. 1, the wheel axis AX of the steering wheel 21 is oriented obliquely upward in a vehicle rearward direction. In the table state shown in FIG. 2, the wheel axis AX of the steering wheel 21 is oriented in the vehicle vertical direction. By rotating the rotation base 22 about the axis in the vehicle width direction, relative to the extendable portion 23, the wheel axis AX of the steering wheel 21 can be inclined. In other words, the rotation base 22 and the extendable portion 23 constitute an inclination mechanism to incline the wheel axis AX. In the table state, the extendable portion 23 is elongated from the instrument panel 12 in the vehicle rearward direction, as compared with that in the driving state.

Figure 2:
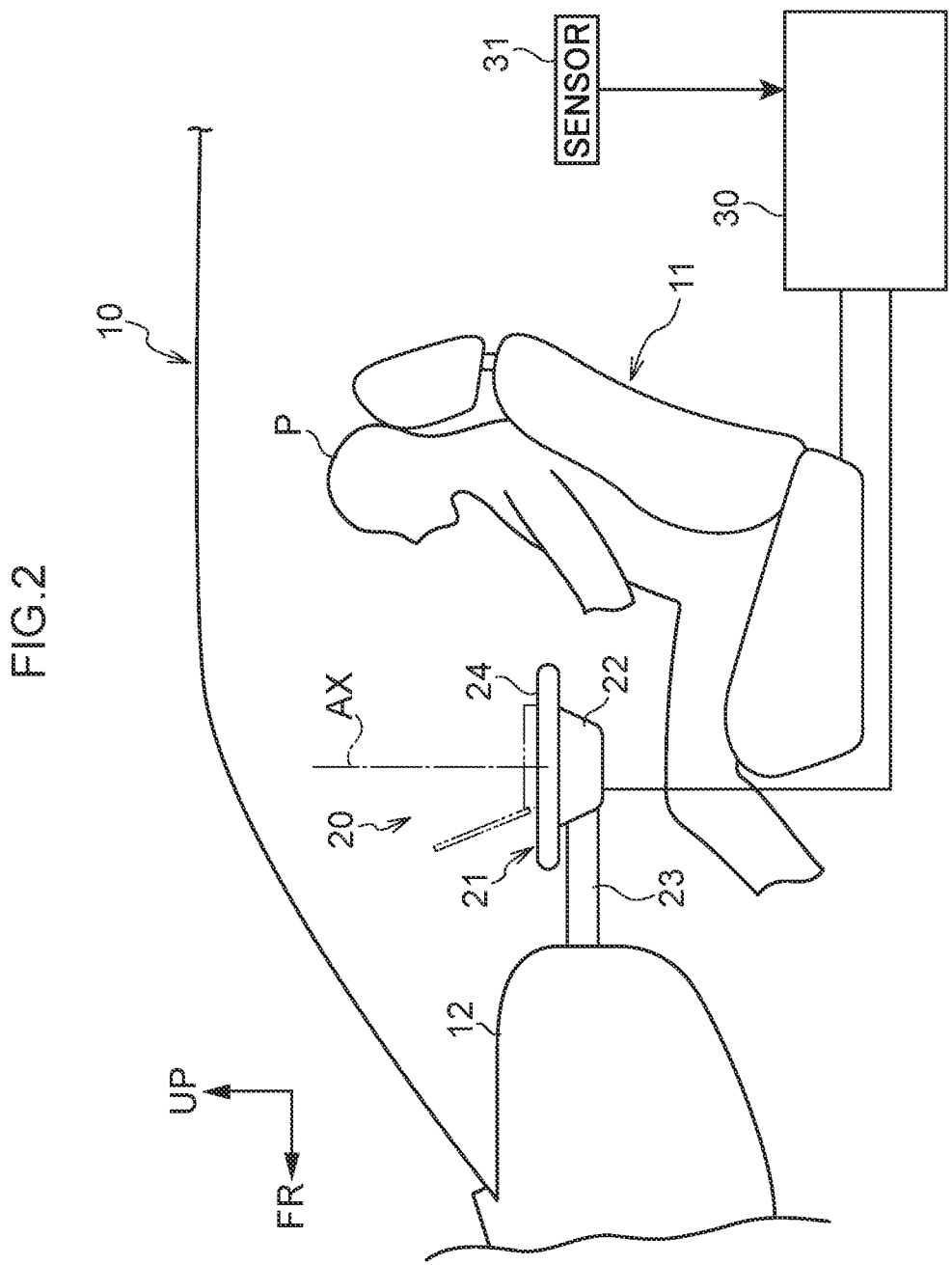
FIG. 2 is a side view of the vehicle according to the first embodiment, showing the vicinity of the driver's seat in a table state.
Figure 3:
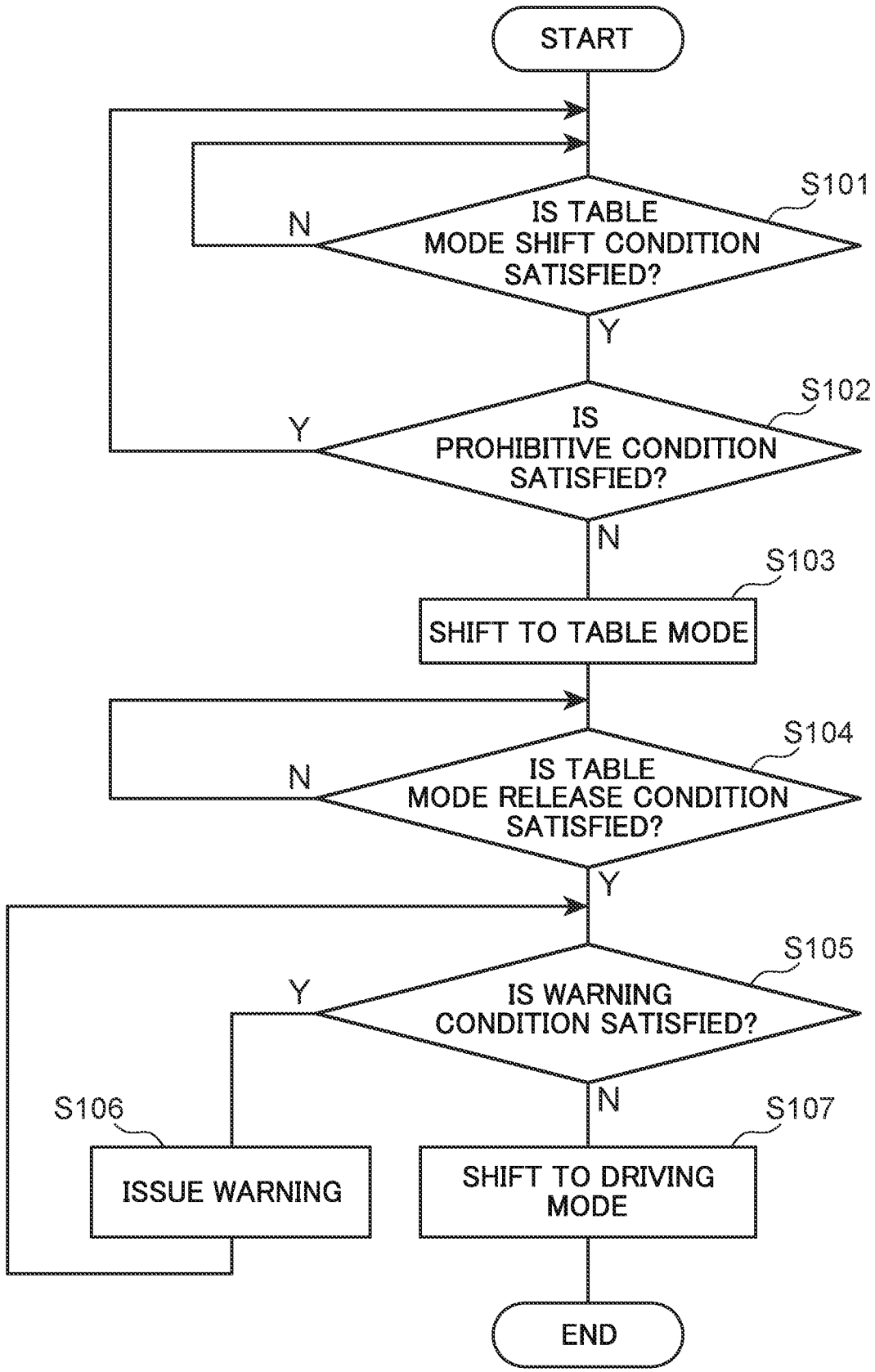
FIG. 3 is a flowchart showing an example of a process of an ECU according to the first embodiment.

As shown in FIG. 2, the steering wheel 21 in the table position functions as a table that is used by an occupant (driver P) sitting in the driver's seat 11. To be more specific, the steering wheel 21 has a top plate surface 24. The top plate surface 24 is a plane orthogonal to the wheel axis AX. In a case where the steering wheel 21 is in the table position, the top plate surface 24 becomes a plane having a normal direction that is oriented in the vehicle upward direction, and functions as a table surface on which an object, such as a PC (refer to chain double-dashed lines in FIG. 2), can be put.

The steering wheel 21 is provided with a horn button (not illustrated). The horn button is provided at a part of an area of the top plate surface 24. In other words, the horn button is provided as a part of the plane-shaped top plate surface 24. In a case where the steering wheel 21 is in the table position, an ECU 30, described later, controls so as not to sound a horn, even if the horn button is pushed.

<Control>

The vehicle 10 includes the ECU 30. The ECU 30 controls the steering device 20 and the driver's seat 11. FIG. 3 is a flowchart showing an example of a process of the ECU 30.

In step S101, the ECU 30 determines whether or not a table mode shift condition is satisfied. If the ECU 30 determines that the table mode shift condition is not satisfied, the ECU 30 returns the process to step S101. If the ECU 30 determines that the table mode shift condition is satisfied, the ECU 30 proceeds the process to step S102.

(Table Mode Shift Condition)

The table mode shift condition is, for example, any one of the followings.

An occupant has performed a table mode shift operation.
The vehicle has been shifted to an automatic driving mode.

Note that, the table mode shift condition may be appropriately modified, considering a situation in which an occupant requires a shift to the table mode.

In step S102, the ECU 30 determines whether or not a prohibitive condition is satisfied. If the ECU 30 determines that the prohibitive condition is satisfied, the ECU 30 returns the process to step S101. If the ECU 30 determines that the prohibitive condition is not satisfied, the ECU 30 proceeds the process to step S103.

(Prohibitive Condition)

The prohibitive condition is, for example, any one of the followings.

The vehicle is driving in any driving mode other than the automatic driving mode (for example, a shift lever is set at any range other than a P range, in any driving mode other than the automatic driving mode).

The occupant has set to prohibit (lock) a shift to the table mode in advance.

The prohibitive condition may be appropriately modified, considering a situation in which the steering wheel 21 is not shifted to the table position, even if the occupant has performed the operation.

In step S103, the ECU 30 places the vehicle in the table mode, and the process proceeds to step S104. In the table mode, the steering device 20 becomes the table state, and the steering wheel 21 moves to the table position. In the table mode, the driver's seat 11 electrically slides in the vehicle rearward direction. Therefore, large space is automatically secured around the driver P's feet.

In step S104, the ECU 30 determines whether or not a table mode release condition is satisfied. If the ECU 30 determines that the table mode release condition is not satisfied, the ECU 30 returns the process to step S104. If the ECU 30 determines that the table mode release condition is satisfied, the ECU 30 proceeds the process to step S105.

(Table Mode Release Condition)

The table mode release condition is, for example, any one of the followings.

The occupant has performed a table mode release operation.
It is determined that the vehicle is shifted from the automatic driving mode to a manual driving mode.

In step S105, the ECU 30 determines whether or not a warning condition is satisfied. If the ECU 30 determines that the warning condition is satisfied, the ECU 30 proceeds the process to step S106. If the ECU 30 determines that the warning condition is not satisfied, the ECU 30 proceeds the process to step S107.

(Warning Condition)

The warning condition is, for example, any one of the followings.

An object is put on the top plate surface 24 (the ECU 30 may function as an object detection unit to determine the presence or absence of an object, based on information from various types of sensors 31, including a camera to image an area on the top plate surface 24, a weight sensor, and the like).

The warning condition may be appropriately modified, considering a situation in which the steering wheel 21 should not return to the driving position.

In step S106, the ECU 30 gives a warning to the occupant, and returns the process to step S105. The warning may be issued as a warning sound using an in-vehicle speaker, a warning mark displayed on a liquid crystal display, or the like.

In step S107, the ECU 30 places the vehicle in the driving mode, and the process ends. In the driving mode, the steering device 20 becomes the driving state, and the steering wheel 21 returns to the driving position. In the driving mode, the driver's seat 11 electrically slides in the vehicle frontward direction, and returns to the original position.

<Operational Effects>

Next, operational effects of the present embodiment will be described.

In the present embodiment, the steering wheel 21 can be moved between the driving position shown in FIG. 1 and the table position shown in FIG. 2. The steering wheel 21 in the table position functions as a table for the driver P who is sitting in the driver's seat 11. Therefore, since the steering wheel 21 itself becomes the table, the table for the driver P can be prepared without considering interference with the steering wheel 21, and the like.

To be more specific, the steering wheel 21 has the top plate surface 24. In a case where the steering wheel 21 is in the table position, the top plate surface 24 becomes a flat surface having a normal direction that is oriented in the vehicle upward direction. In other words, the steering wheel 21 itself functions as a top plate having the top plate surface 24. Therefore, the table can be prepared, without requiring time and effort to fit a top plate member (refer to a top plate cover 40 of FIG. 6 according to a second embodiment) or the like on the steering wheel 21.

In the present embodiment, the object detection unit is provided to determine the presence or absence of an object put on the table. If the object is present, a shift from the table position is prohibited.

Since the steering wheel 21 does not move to the driving position or the like, while an object is put thereon, it is possible to prevent a drop of the object.

In the present embodiment, the ECU 30 electrically controls the driver's seat 11. In other words, the vehicle 10 is provided with a driver's seat control unit to control the driver's seat 11. While the steering wheel 21 moves from the driving position to the table position, the driver's seat control unit electrically slides the driver's seat 11 to a table use position (refer to FIG. 2), which is in a vehicle rearward position relative to a normal driving position (refer to FIG. 1). Therefore, large space is automatically secured around feet of the driver P who is using the table, thus allowing an improvement in comfortableness.

In the present embodiment, while the steering wheel 21 moves from the table position to the driving position, the driver's seat control unit electrically slides the driver's seat 11 to the normal driving position (refer to FIG. 1). Therefore, since the driver's seat 11 automatically returns to the normal driving position, it is possible to save time and effort to readjust the position of the driver's seat, at the time of starting driving.

Second Embodiment: Top Plate Cover is Fitted

Next, a second embodiment will be described with reference to FIGS. 4 to 6. Note that, the same components as in the other embodiments are indicated with the same reference numerals in the drawings, and a description thereof is omitted.

Figure 5:
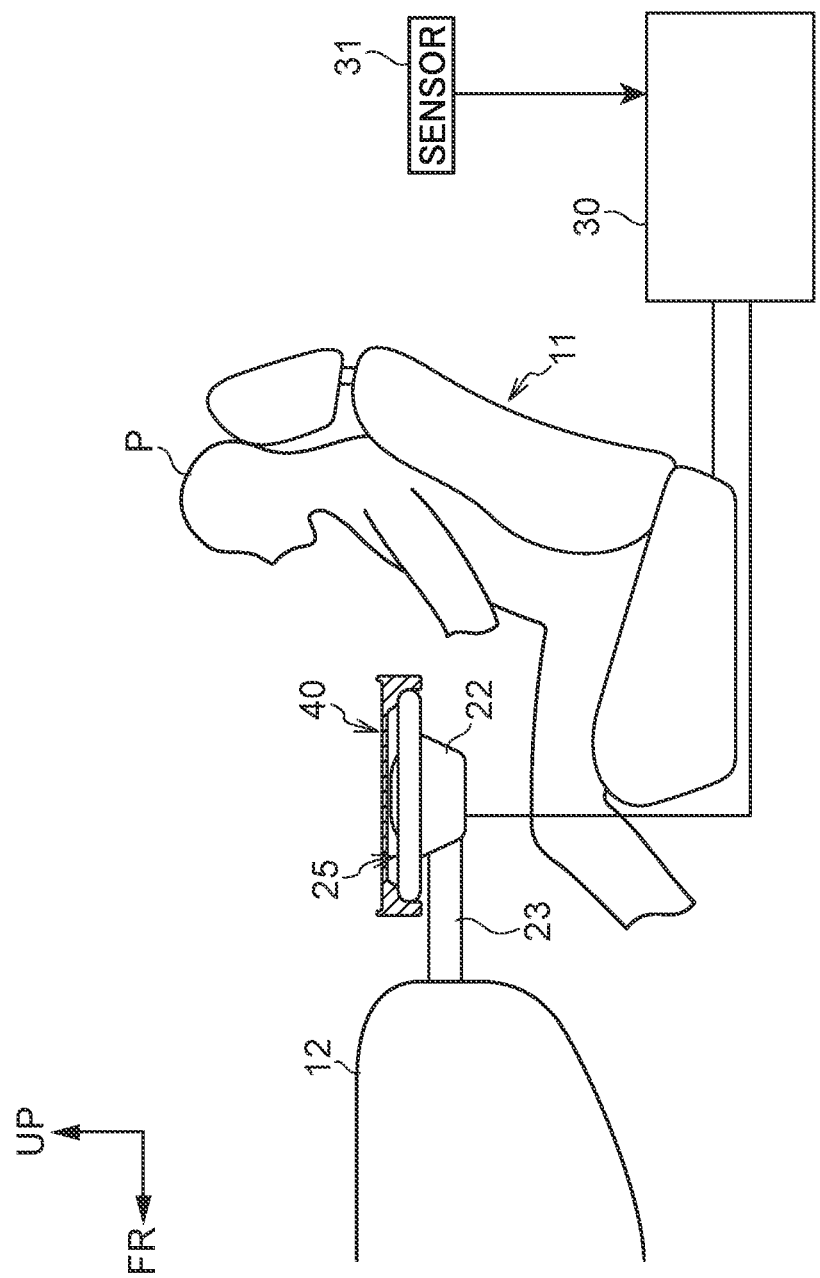
FIG. 5 is a side view of the vehicle according to the second embodiment, showing the vicinity of the driver's seat in a table state.

In the second embodiment, as shown in FIG. 5, to prepare a table for the driver P, a top plate cover 40, as "a top plate member", is fitted on a steering wheel 25 in the table position.

The steering wheel 25 according to the second embodiment has a rim 25A. The rim 25A is in the shape of a round that centers on the wheel axis AX. The steering wheel 25 also has a horn button 25B. The horn button 25B is provided at an inner middle of the round rim 25A. The rim 25A and the horn button 25B are coupled through not-illustrated spokes. As shown in FIGS. 4 to 6, the horn button 25B is configured to protrude from the rim 25A, when viewing the steering wheel 25 from a direction orthogonal to the wheel axis AX.

As shown in FIG. 5, in the table position, the wheel axis AX of the steering wheel 25 is oriented in the vehicle vertical direction. The steering wheel 25 in the table position is configured such that the top plate cover 40 can be fitted on the steering wheel 25 from the vehicle upward direction.

Figure 6:
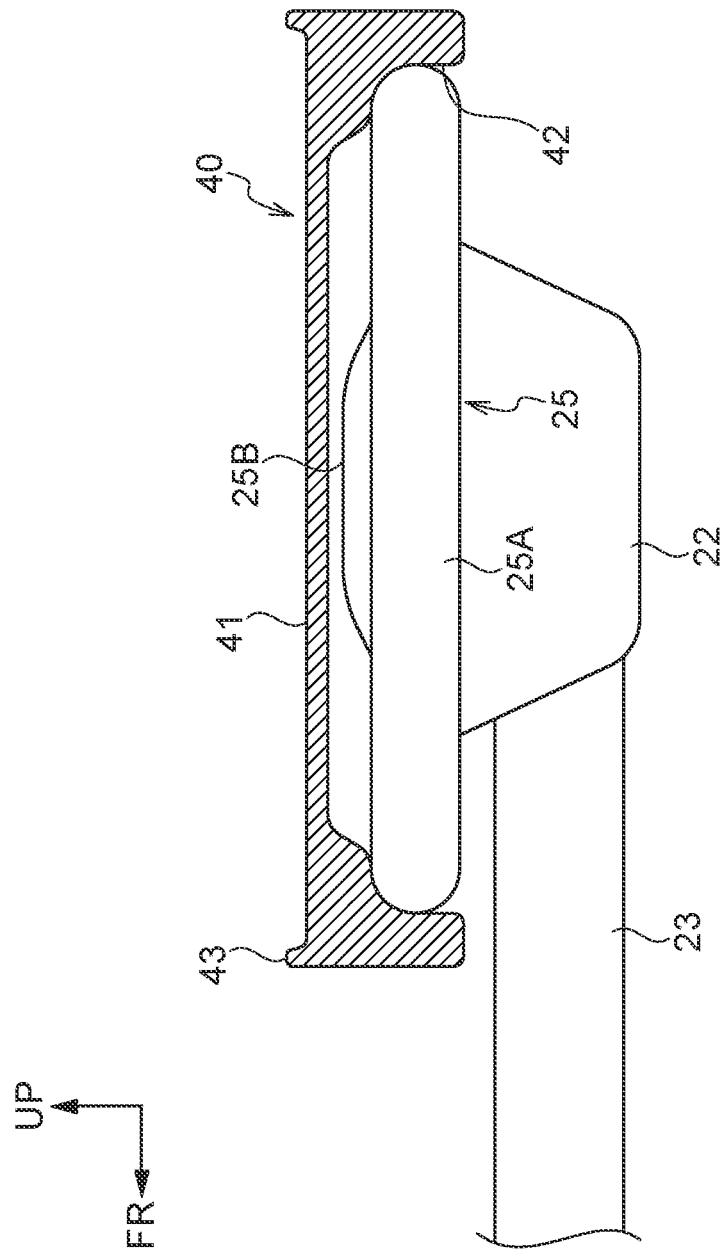
FIG. 6 is an enlarged view of a steering wheel and a top plate cover, in the table state according to the second embodiment.

As shown in FIG. 6, the top plate cover 40 has a top plate surface 41. In a state of fitting the top plate cover 40 on the steering wheel 25 in the table position, the top plate surface 41 becomes a surface having a normal direction that is oriented in the vehicle upward direction, and functions as a table surface on which an object, such as a PC, can be put stably.

The top plate cover 40 has a position securing portion 42 that secures the position of the top plate cover 40 in a horizontal direction, relative to the steering wheel 25 in the table position. The position securing portion 42 is formed approximately in a ring shape. The position securing portion 42 is designed such that the rim 25A of the steering wheel 25 is just fitted into the approximately ring-shaped position securing portion 42. Therefore, in a state of fitting the top plate cover 40 on the steering wheel 25 in the table position, the position of the top plate cover 40 is secured in the horizontal direction.

The top plate cover 40 has a protrusion 43 that slightly protrudes from the top plate surface 41 in the direction of the wheel axis AX. The protrusion 43 is formed at the rim of the top plate surface 41 along the entire circumference. The protrusion 43 prevents a drop of the put object.

The ECU 30 performs the same process as described in the first embodiment.

However, the following condition may be added as a warning condition.

The top plate cover 40 is fitted on the steering wheel 25 (the ECU 30 may function as a determiner to determine the presence or absence of fittings, based on a sensor or the like provided in the steering wheel 25).

Modification Example of Second Embodiment

The top plate cover 40 may integrally have a stand (not illustrated) to erect a tablet PC or a book.

<Operational Effects>

Next, operational effects of the present embodiment will be described.

Figure 4:
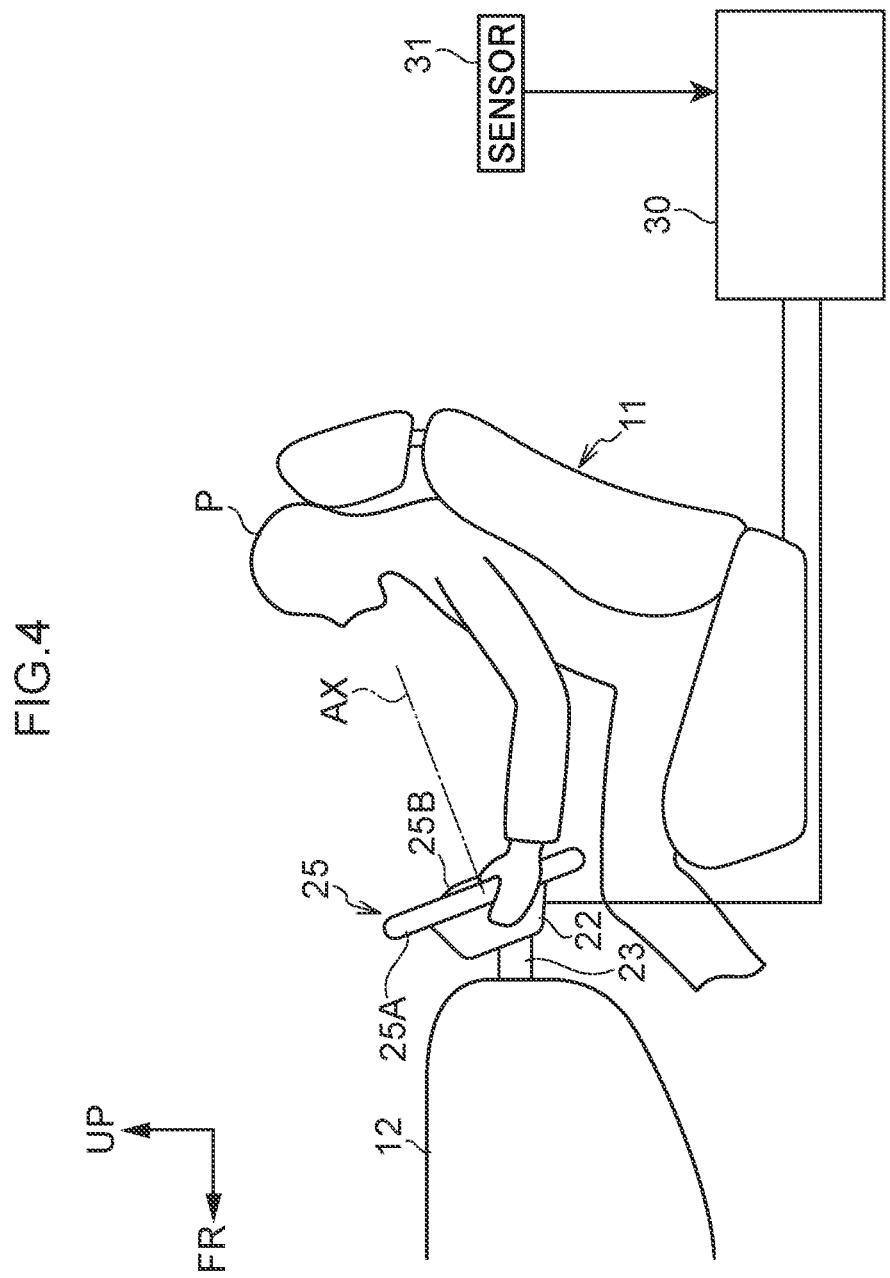
FIG. 4 is a side view of a vehicle according to a second embodiment, showing the vicinity of a driver's seat in a driving state.

In the present embodiment, the steering wheel 25 can be moved between the driving position shown in FIG. 4 and the table position shown in FIG. 5. The steering wheel 25 in the table position functions as a part of a table for use by the occupant (driver P) who is sitting in the driver's seat 11.

Therefore, since the steering wheel itself becomes a part of the table, the table for the driver P can be prepared without considering interference with the steering wheel 25, and the like.

To be more specific, the top plate cover 40 that is configured to fit on the steering wheel 25 in the table position is provided. The fitted top plate cover 40 becomes a top plate of the table for the occupant, i.e. the driver P sitting on the driver's seat. This eliminates the need for forming a table surface (refer to the top plate surface 24 shown in FIGS. 1 and 2 according to the first embodiment) or the like in the steering wheel 25 itself, thus allowing securing freedom in the design of the steering wheel 25.

In the present embodiment, the top plate cover 40 fitted on the steering wheel 25 disables the horn button 25B of the steering wheel 25. Therefore, the horn is prevented from being sounded unintendedly.

Third Embodiment: Table Comes Out of Instrument Panel

Next, a third embodiment will be described with reference to FIGS. 7 to 12. Note that, the same components as in the other embodiments are indicated with the same reference numerals in the drawings, and a description thereof is omitted.

Figure 7:
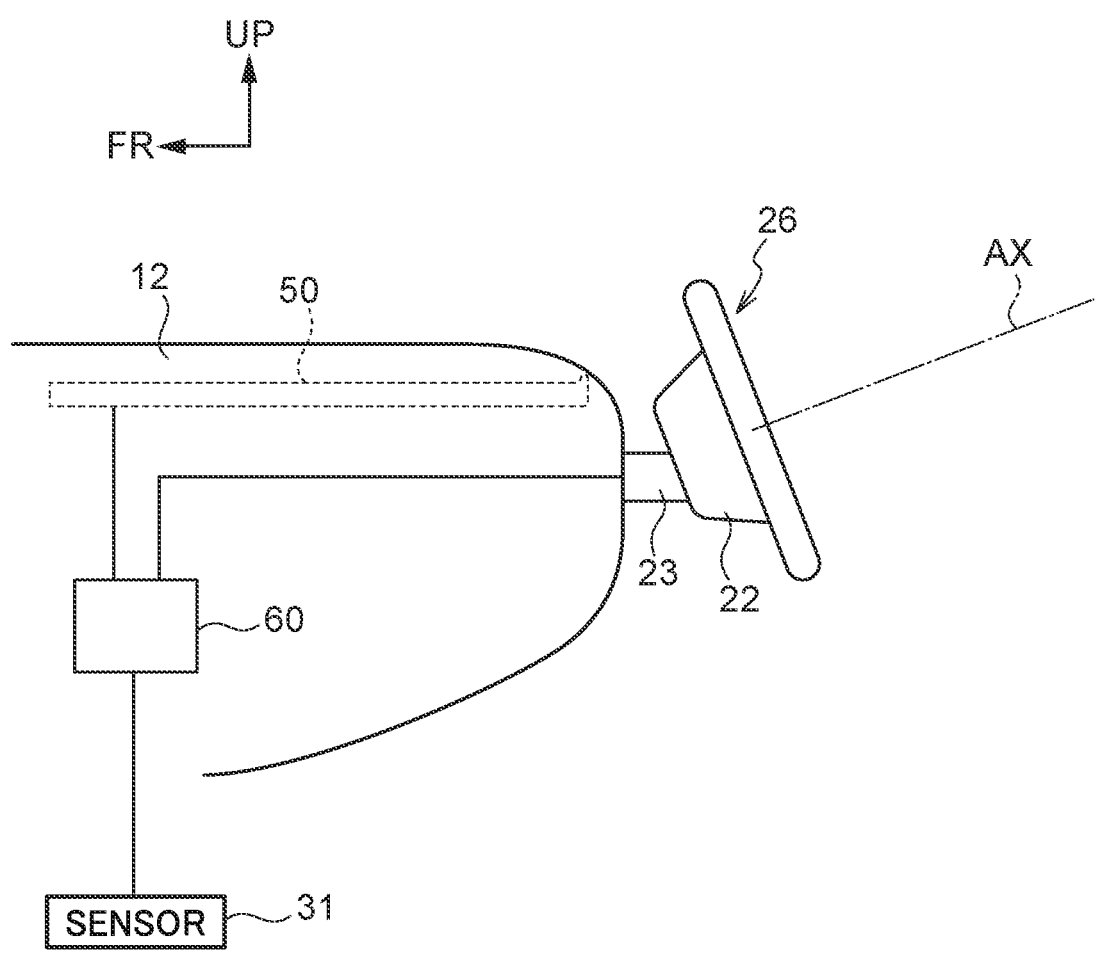
FIG. 7 is a side view of a vehicle according to a third embodiment, showing the vicinity of a steering wheel in a driving state.
Figure 8:
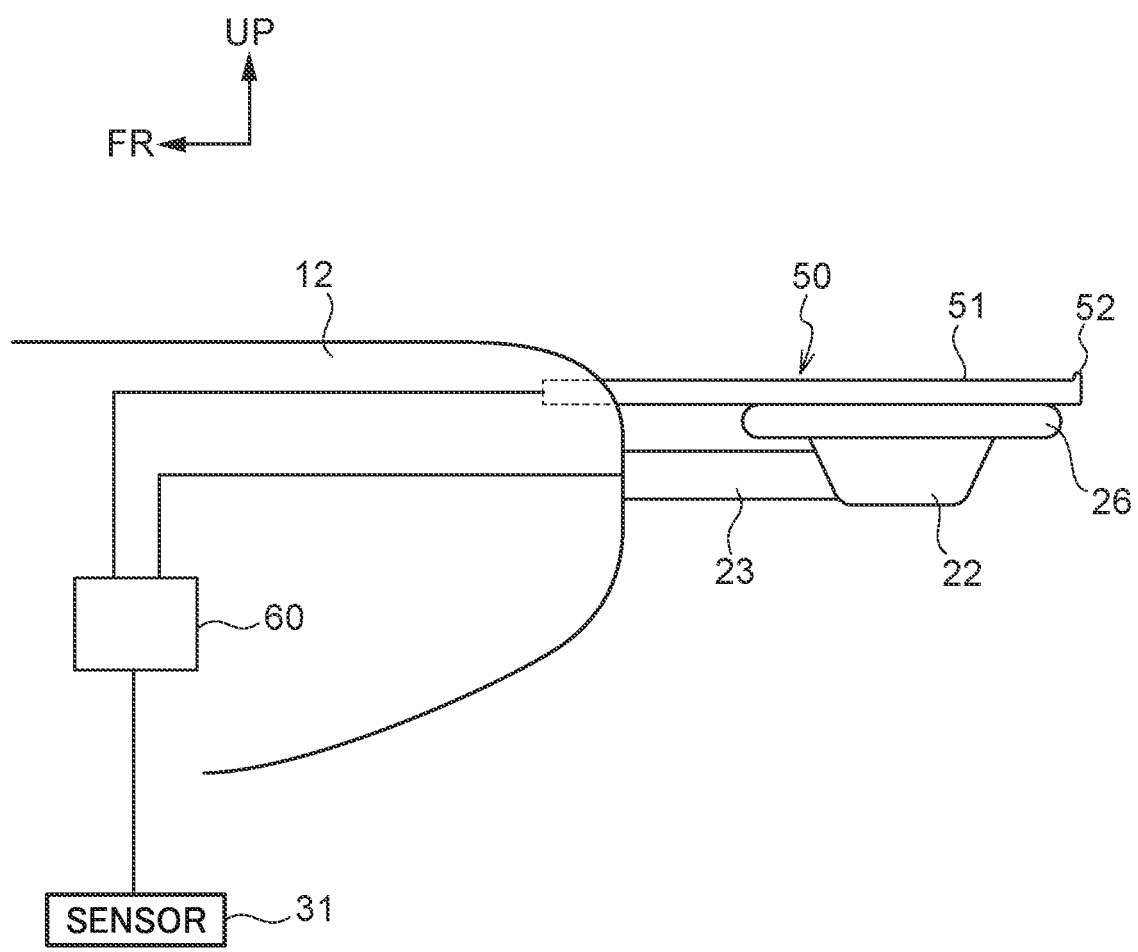
FIG. 8 is a side view of the vehicle according to the third embodiment, showing the vicinity of the steering wheel in a table state.
Figure 9:
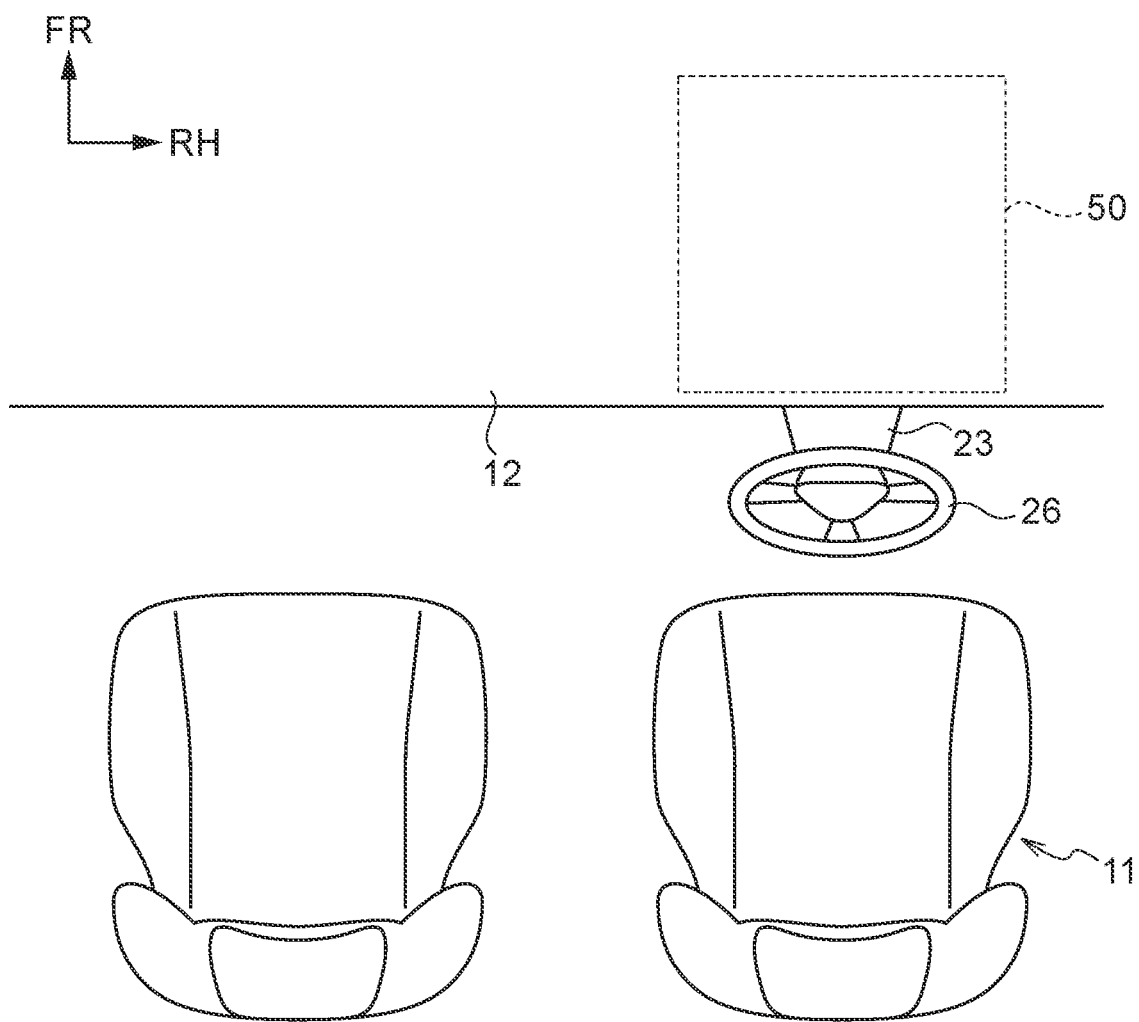
FIG. 9 is a top plan view in the driving state according to the third embodiment.

FIGS. 7 and 9 show a driving state in the third embodiment, and FIGS. 8 and 10 show a table state in the third embodiment. In the third embodiment, a slide top plate 50 is provided as "a top plate member". The slide top plate 50 is provided in a slidable manner between a containment position (FIGS. 7 and 9) in which it is contained in the instrument panel 12 and a table position (FIGS. 8 and 10) in which it protrudes from the instrument panel 12 in the vehicle rearward direction. The electrically slidable slide top plate 50 is controlled by an ECU 60.

As shown in FIG. 8, the slide top plate 50 has a plane-shaped top plate surface 51 having a normal direction that is oriented in the vehicle upward direction. As shown in FIG. 10, the slide top plate 50 has a rectangular shape in a planar view. The slide top plate 50 has protrusions 52 that slightly protrude from the top plate surface 51 in the vehicle upward direction. As shown in FIG. 10, the protrusions 52 are provided at a vehicle rearward edge and both vehicle lateral edges of the top plate surface 51. The protrusions 52 prevent a drop of a put object.

The steering device 20 includes a steering wheel 26, the rotation base 22, and the extendable portion 23. As in the cases of the first and second embodiments, in the driving state, the steering wheel 26 is in the driving position in which a wheel axis AX of the steering wheel 26 is oriented obliquely upward in the vehicle rearward direction. In the table state, the steering wheel 26 is in the table position in which the wheel axis AX of the steering wheel 26 is oriented in the vehicle vertical direction. As shown in FIG. 8, the steering wheel 26 in the table position contacts the slide top plate 50 in the table position from a vehicle lower direction, to support the slide top plate 50. In other words, the steering wheel 26 in the table position constitutes a part of a table, as a support portion to support the slide top plate 50. Therefore, even in a case where a heavy object is put on the slide top plate 50 that protrudes from the instrument panel 12 in the vehicle rearward direction, it is possible to prevent a break of the slide top plate 50.

Figure 11:
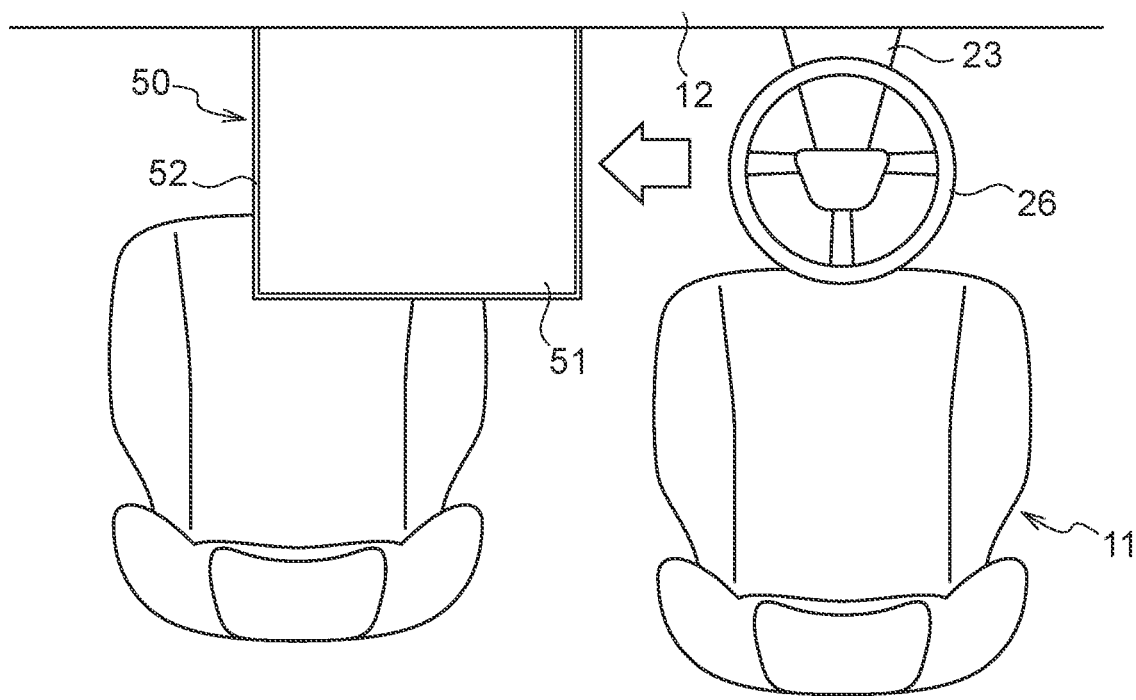
FIG. 11 is a top plan view in an evacuation state according to the third embodiment.

The slide top plate 50 is configured to be slidable between the table position shown in FIG. 10 and an evacuation position shown in FIG. 11. As shown in FIG. 1, the evacuation position is situated at the side of a front passenger seat in the vehicle width direction, relative to the table position. By moving the slide top plate 50 from the table position to the evacuation position, the slide top plate 50 can be evacuated from the position on the steering wheel 26 in the table position, while the object remains placed thereon. Evacuating the slide top plate 50 from the table position to the evacuation position allows the steering wheel 26 to return to the driving position.

Figure 12:
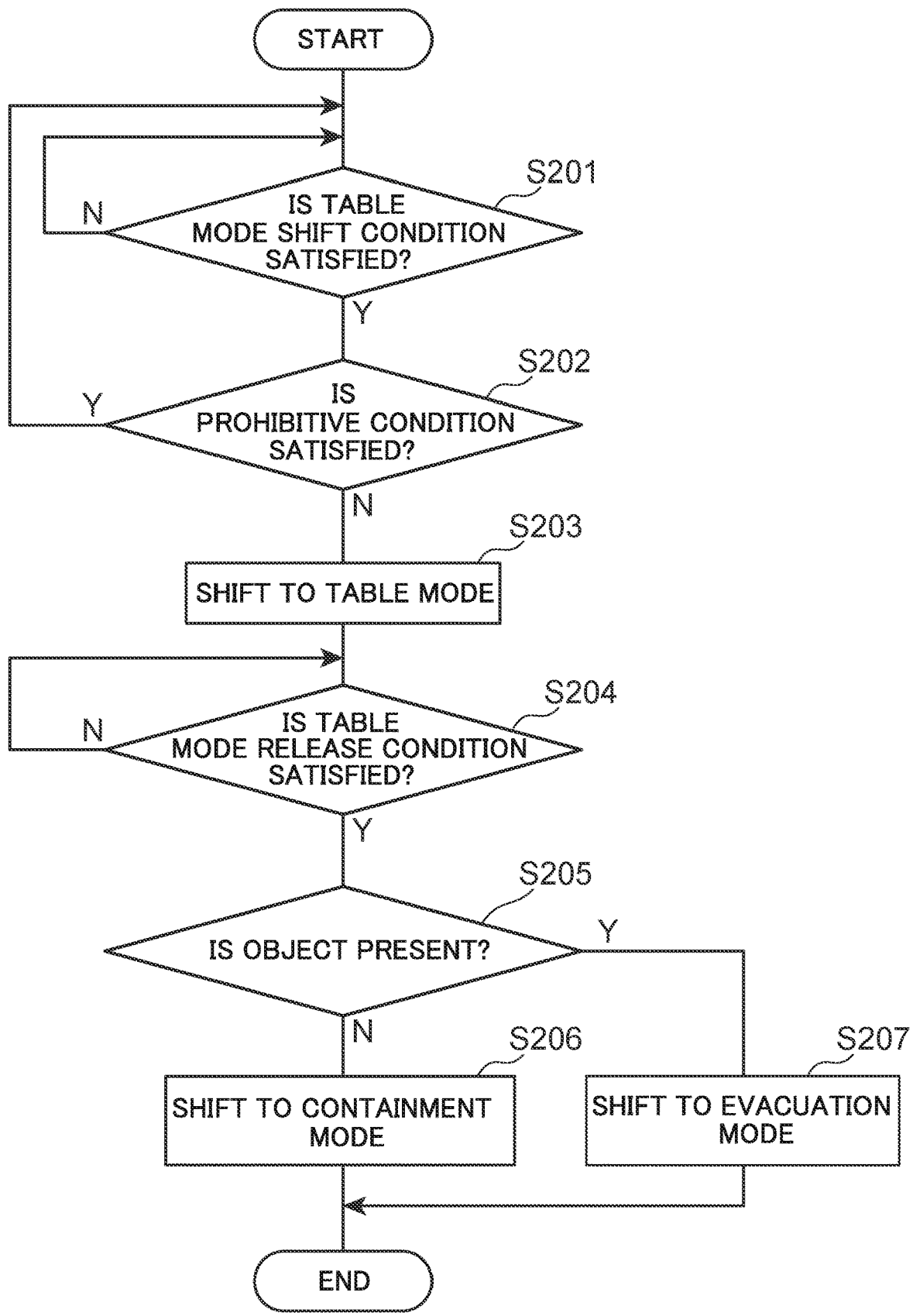
FIG. 12 is a flowchart showing an example of a process of an ECU according to the third embodiment.

FIG. 12 is a flowchart showing an example of a process of the ECU 60.

In step S201, the ECU 60 determines whether or not a table mode shift condition is satisfied. If the ECU 60 determines that the table mode shift condition is not satisfied, the ECU 60 returns the process to step S201. If the ECU 60 determines that the table mode shift condition is satisfied, the ECU 60 proceeds the process to step S202.

The table mode shift condition may be the same as that in the first embodiment.

In step S202, the ECU 60 determines whether or not a prohibitive condition is satisfied. If the ECU 60 determines that the prohibitive condition is satisfied, the ECU 60 returns the process to step S201. If the ECU 60 determines that the prohibitive condition is not satisfied, the ECU 60 proceeds the process to step S203.

The prohibitive condition may be the same as that in the first embodiment.

In step S203, the ECU 60 places the vehicle in the table mode, and the process proceeds to step S204. In the table mode, the steering device 20 becomes the table state. While the steering wheel 26 moves to the table position, the slide top plate 50 slides in the vehicle rearward direction to the table position, in which the slide top plate 50 protrudes from the instrument panel 12. In the table mode, the driver's seat 11 electrically slides in the vehicle rearward direction.

In step S204, the ECU 60 determines whether or not a table mode release condition is satisfied. If the ECU 60 determines that the table mode release condition is not satisfied, the ECU 60 returns the process to step S204. If the ECU 60 determines that the table mode release condition is satisfied, the ECU 60 proceeds the process to step S205.

The table mode release condition may be the same as that in the first embodiment.

In step S205, the ECU 60 determines the presence or absence of an object put on the table. If the ECU 60 determines that an object is absent, the ECU 60 proceeds the process to step S206. If the ECU 60 determines that an object is present, the ECU 60 proceeds the process to step S207.

In step S206, the ECU 60 places the vehicle in the driving mode, and the process ends. In the driving mode, the slide top plate 50 electrically moves from the table position to the containment position, and the steering device 20 changes from the table state to the driving state. The driver's seat 11 electrically slides in the vehicle frontward direction, and returns to the original position.

In step S207, the ECU 60 places the vehicle in an evacuation mode, and the process ends. In the evacuation mode, the slide top plate 50 electrically moves from the table position to the evacuation position, and the steering device 20 changes from the table state to the driving state. The driver's seat 11 electrically slides in the vehicle frontward direction, and returns to the original position.

<Operational Effects>

Next, operational effects of the present embodiment will be described.

In the present embodiment, the steering wheel 26 can move between the driving position shown in FIG. 7 and the table position shown in FIG. 8. The steering wheel 26 in the table position functions as a part of the table for use by the occupant sitting in the driver's seat 11. Therefore, since the steering wheel 26 itself becomes a part of the table, the table for the driver P can be prepared without considering interference with the steering wheel 26, and the like.

To be more specific, the slide top plate 50 is provided as "a top plate member" that is configured to be movable between the containment position in which it is contained in the instrument panel 12 and the table position protruding in the vehicle rearward direction from the instrument panel 12. The slide top plate 50 in the table position is supported by the steering wheel 26 in the table position from beneath. Therefore, it is possible to secure the strength of the table in the structure in which the slide top plate 50 protrudes from the instrument panel 12 in the vehicle rearward direction. Furthermore, since the steering wheel 26 itself does not become a top plate, it is possible to secure freedom in the design of the steering wheel 26. The table is prepared by moving the slide top plate 50 from the containment position to the table position, thus allowing saving time and effort to fit a top plate member (refer to the top plate cover 40 shown in FIGS. 4 and 5 according to the second embodiment) on the steering wheel 26.

If the slide top plate 50 is maintained in the table position shown in FIGS. 8 and 10, the steering wheel 26 cannot return to the driving position. However, in a case where an object is present on the slide top plate 50, an incautious movement of the slide top plate 50 may cause a drop of the object, or the like.

Accordingly, in the present embodiment, the slide top plate 50 can slide from the table position shown in FIG. 10 to the evacuation position shown in FIG. 11, while the object stays on the table. The evacuation position is a position that allows the steering wheel 26 to return to the driving position. Therefore, the steering wheel 26 can return to the driving position, while the object remains placed on the slide top plate 50.

In the present embodiment, as shown in FIG. 11, the evacuation position is situated at the side of the front passenger seat in the vehicle width direction, relative to the table use position. Therefore, in a state that the slide top plate 50 is in the evacuation position, the passenger P sitting in the driver's seat 11 can laterally reach out his or her hand to the object that is put on the slide top plate 50, and take the object in his or her hand.

Modification Example of Third Embodiment

The slide top plate 50 in the containment position may be contained in the instrument panel 12 so that the occupant inside the vehicle cannot see the top plate surface 51. Alternatively, the top plate surface 51 of the slide top plate 50 in the containment position may constitute a top surface of the instrument panel 12.

Supplementary Explanation of Above Embodiments

In the above embodiments, the steering device 20 adopts the steer-by-wire method, but the present disclosure is not limited to this. The steering device 20 may adopt a method in which the rotation operation of the steering wheel is transmitted to front wheels by mechanical coupling. In this case, the use of, for example, a universal joint allows realizing a steering wheel that can move between the driving position and the table position.

In the above embodiment, the state of the steering device 20 is electrically changed (between the driving state and the table state), but the steering wheel may be moved by a manual operation of the occupant P, e.g. by applying manual force to the steering wheel.

What is claimed is:

1. A vehicle, comprising:
a steering wheel that can move between a driving position in which an occupant operates the steering wheel and a table position in which a wheel axis is oriented in a vehicle vertical direction; and
a top plate member that can move between a table position in which the steering wheel supports the top plate member from beneath, and an evacuation position in which the top plate member allows the steering wheel to return to the driving position while an object remains placed on the top plate member,
wherein the steering wheel in the table position functions as a table or a part of a table for use by the occupant, who is sitting in a driver's seat.

2. The vehicle according to claim 1, wherein the steering wheel has a flat top plate surface having a normal direction that is oriented in a vehicle upward direction in the table position.

3. The vehicle according to claim 1, further comprising:
an object detection unit that determines whether or not an object has been placed on the top plate member,
wherein, in a case in which an object is present on the top plate member, the steering wheel is prohibited from moving from the table position.

4. The vehicle according to claim 1, wherein:
the top plate member can move between a containment position in which the top plate member is contained in an instrument panel and the table position in which the top plate member protrudes from the instrument panel in a vehicle rearward direction,
the steering wheel in the table position functions as a support portion of the table for use by the occupant sitting in the driver's seat, by supporting the top plate member in the table position from beneath.

5. The vehicle according to claim 4, wherein the evacuation position of the top plate member is situated at a side of a front passenger seat in a vehicle width direction, relative to the table position of the top plate member.

6. The vehicle according to claim 1, further comprising:
a control unit that controls the driver's seat,
wherein, while the steering wheel moves from the driving position to the table position, the control unit slides the driver's seat to a table use position that is in a vehicle rearward position relative to a normal driving position.

7. The vehicle according to claim 6, wherein, while the steering wheel moves from the table position to the driving position, the control unit slides the driver's seat to the normal driving position.

8. A vehicle, comprising:
a steering wheel that can move between a driving position in which an occupant operates the steering wheel and a table position in which a wheel axis is oriented in a vehicle vertical direction; and
a top plate member that can move between a table position in which the top plate member protrudes from an instrument panel in a vehicle rearward direction and the steering wheel supports the top plate member from beneath, and an evacuation position in which the top plate member allows the steering wheel to return to the driving position while an object remains placed on the top plate member,
wherein the steering wheel in the table position functions as a table or a part of a table for use by the occupant, who is sitting in a driver's seat.

9. The vehicle according to claim 8, wherein the steering wheel has a flat top plate surface having a normal direction that is oriented in a vehicle upward direction in the table position.

10. The vehicle according to claim 8, further comprising:
an object detection unit that determines whether or not an object has been placed on the top plate member,
wherein, in a case in which an object is present on the top plate member, the steering wheel is prohibited from moving from the table position.

11. The vehicle according to claim 8, wherein:
the top plate member can move between a containment position in which the top plate member is contained in the instrument panel and the table position,
the steering wheel in the table position functions as a support portion of the table for use by the occupant sitting in the driver's seat, by supporting the top plate member in the table position from beneath.

12. The vehicle according to claim 11, wherein the evacuation position of the top plate member is situated at a side of a front passenger seat in a vehicle width direction, relative to the table position of the top plate member.

13. The vehicle according to claim 8, further comprising:
a control unit that controls the driver's seat,
wherein, while the steering wheel moves from the driving position to the table position, the control unit slides the driver's seat to a table use position that is in a vehicle rearward position relative to a normal driving position.

14. The vehicle according to claim 13, wherein, while the steering wheel moves from the table position to the driving position, the control unit slides the driver's seat to the normal driving position.

* * * * *

UNITED STATES PATENT AND TRADEMARK OFFICE
CERTIFICATE OF CORRECTION

| | |
|---|---|
| PATENT NO. | : 10,967,899 B2 |
| APPLICATION NO. | : 16/267585 |
| DATED | : April 6, 2021 |
| INVENTOR(S) | : Noritaka Toyama et al. |

It is certified that error appears in the above-identified patent and that said Letters Patent is hereby corrected as shown below:

In the Specification

In Column 3, Line(s) 43 & 44, after "comfortableness", insert --.--.

In Column 9, Line(s) 42, delete "FIG. 1" and insert --FIG. 11--, therefor.

Signed and Sealed this
Fifteenth Day of June, 2021

Drew Hirshfeld
*Performing the Functions and Duties of the
Under Secretary of Commerce for Intellectual Property and
Director of the United States Patent and Trademark Office*